June 8, 1926.
O. WILKINS ET AL
1,587,692
DEMOUNTABLE RIM FOR AUTOMOBILES
Filed Feb. 10, 1923
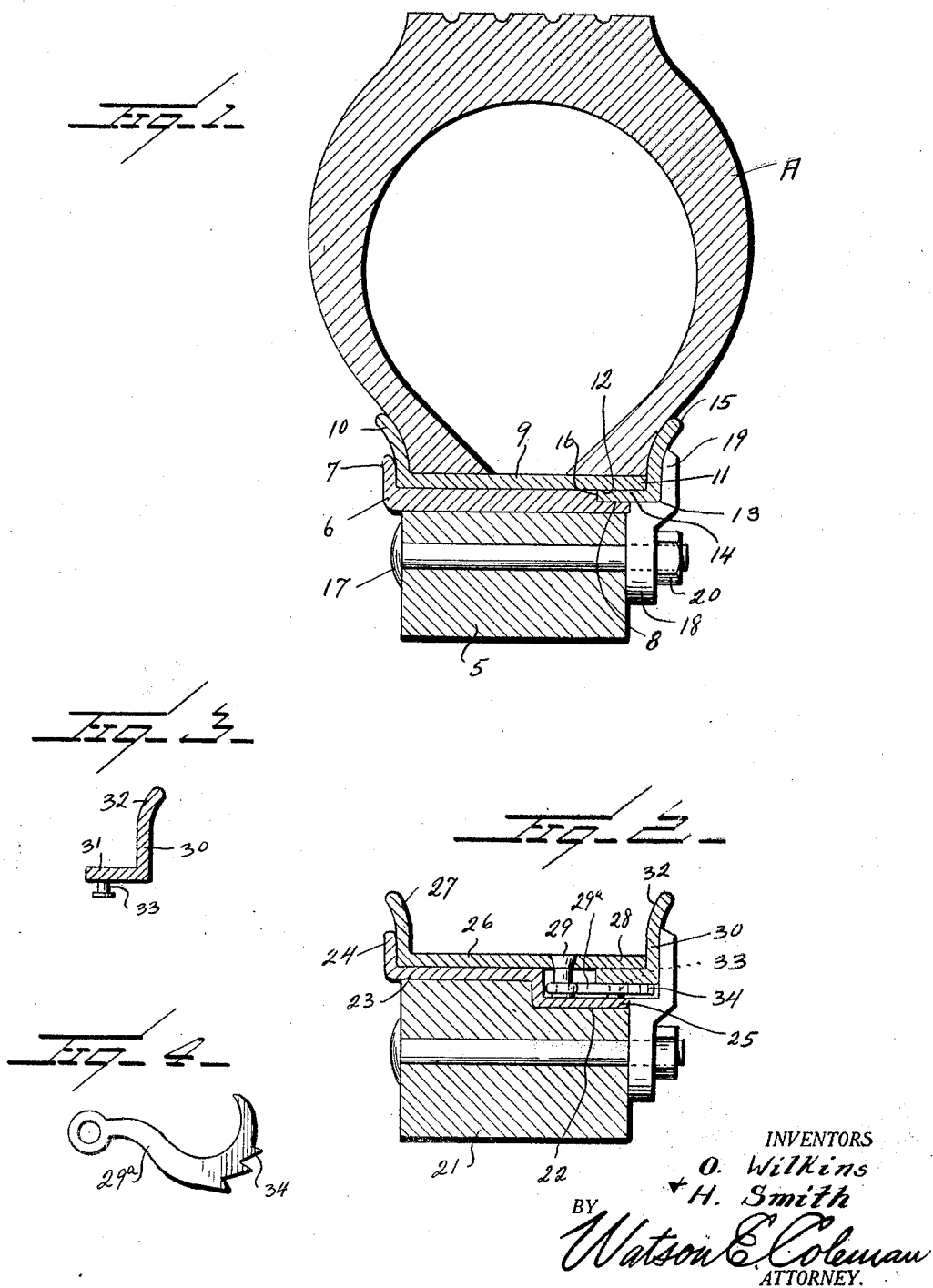
INVENTORS
O. Wilkins
+ H. Smith
BY Watson E. Coleman
ATTORNEY.

Patented June 8, 1926.

1,587,692

UNITED STATES PATENT OFFICE.

ORESTA WILKINS, OF HAVANA, AND HAROLD SMITH, OF BOONVILLE, ARKANSAS.

DEMOUNTABLE RIM FOR AUTOMOBILES.

Application filed February 10, 1923. Serial No. 618,274.

This invention relates to demountable rims for automobiles and has for its object to provide a rim of this character capable of being readily disassembled to facilitate the application or removal of a tire.

It is also an object of the invention to provide means of this character wherein the tire casing may rest upon an unbroken surface and yet is firmly clamped by the sections of the demountable rim.

It is a further object of the invention to provide a device of this character capable of being held in engagement with the wheel and the tire by lugs carried by the felly of the wheel.

It is a further object of the invention to provide a device of this character including a wheel rim section and a tire rim section which coact to provide a compartment having a clamping rim section to permit the beads of the tire to engage a smooth surface, thus eliminating wear and possible damage.

It is a still further object of the invention to provide a device of this character wherein the wheel rim section is provided with fastening means normally disposed within the compartment for engagement with means carried by the clamping rim section to permit the rim to be used for holding a spare tire without requiring use of the rim fastening lugs.

With these and other objects in view, the invention consists in the improved construction and arrangement of parts to be hereinafter more particularly described, fully claimed and illustrated in the accompanying drawings, in which:—

Figure 1 is a transverse sectional view of a demountable rim constructed in accordance with an embodiment of the invention;

Figure 2 is a transverse sectional view of another form of the invention;

Figure 3 is a detailed sectional view of the clamping element shown in Figure 2; and Figure 4 is a plan view of the hook shown in Figure 2.

Referring to the drawings, 5 designates a wheel upon which a wheel rim section 6 is disposed. The section 6 has a supporting flange 7 on one edge thereof, while the opposite edge portion is reduced to provide a recess or depression 8, the recess or depression 8 being disposed adjacent the edge of the wheel 5. This rim section is secured to the outer surface of the felly of the wheel and serves as means for supporting and assisting in the clamping operation of the removable rim sections to be hereinafter described.

In connection with the section 6, a tire rim section 9 is provided. This section includes a holding flange 10 which is extended in angular relation to the body portion of the section and is intended to engage one side of the tire A. The width of the rim section 9 is greater than the width of the section 6 so that the side portion 11 of the section 9 projects beyond the adjacent edge portion of the section 6. By this means the side portion 11 coacts with the depression 8 of the section 6 to provide a compartment 12 which extends annularly of the wheel.

In connection with the tire rim section 9, a clamping rim section 13 is provided. This section consists of a body portion 14 having a flange 15 which corresponds to the flange 10 of the tire rim section, the flange 15 being wider than the flange 10 so as to project beyond the side portion 11 of the tire rim section and to substantially coact with the flange 10 to hold a tire. The inner edge 16 of the body portion 14 is intended to engage the inner wall of the depression or recess 8 to limit movement of the clamping section inwardly of the compartment. The edge of the side portion 11 of the tire rim section is also intended to engage the inner face of the flange 15.

Projecting through the felly 5 of the wheel is a plurality of bolts 17 having their threaded ends projecting beyond the side of the felly adjacent the flange 15 for the reception of clamping lugs 18, each of said lugs having its end portion 19 offset for engagement with the outer surface of the flange 15 of the clamping section 13. These lugs are held in engagement with the wheel by nuts 20 threaded on the projecting ends of the bolts.

When it is desired to remove the tire the lugs 18 are released and the clamping section moved outwardly from the compartment 12, thereby releasing the wheel rim section. The tire may then be removed as well as the tire rim section without difficulty.

In Figures 2 to 4, another form of the invention is shown. This form comprises a wheel felly 21 having a portion of its surface reduced to provide a depression 22. A section 23 is provided for the felly. This section has one side portion formed into a holding flange 24 while the opposite side portion 25 is offset and disposed within the depression 22. A tire rim section 26 is provided, said section corresponding in structure to the tire rim section 9 and includes a tire engaging flange 27. The side portion 28 of the tire rim section is intended to extend over the offset portion 25 of the wheel rim section so as to coact with said offset portion to provide a compartment. Depending from the inner face of the side portion 28 of the tire rim section are lugs 29, said lugs being disposed at spaced intervals annularly of the section. These lugs are intended to receive hooks 29a said hooks being movable within the compartment.

In connection with the tire rim section, a clamping rim section 30 is provided. The body portion 31 of said section is intended to be disposed within the compartment formed by the offset portion 25 of the rim 23 and rim section 26. The clamping rim section also includes a flange 32 which is intended to substantially coact with the flange 27 to clamp a tire to the wheel. Depending from the inner face of the body portion 31 is a plurality of studs 33, which are spaced annularly of the clamping rim section. These studs, when the body portion 31 is disposed within the compartment, are intended to be engaged by the hooks 29a so as to urge the inner edge of the body member 31 in engagement with the inner wall of the offset portion of the wheel rim and thus permit a spare tire to be held without the use of clamping lugs, each hook being provided with finger pieces 34.

The clamping lugs may also be used to permit this form of the invention to be used for holding the tire on the wheel as the studs and ratchet hooks are normally disposed within the compartment.

From the foregoing it will be readily seen that this invention provides a novel form of demountable rim capable of being operated by anyone without unnecessary strain. In addition to this the rim is composed of only a small number of simple parts capable of being applied to the conventional type of wheel.

What is claimed is:—

A demountable rim comprising a main rim section including a circular band having at one edge thereof a flange and having upon its inner surface adjacent the opposite edge thereof and at circumferentially spaced points inwardly extending lugs and a continuous complementary rim section of less internal diameter then the main rim section, said complementary rim section comprising a band telescopically engageable with the band of the first named rim section and having at one side thereof a flange limiting such telescopic engagement, the inner face of the band of the complementary section being provided with a plurality of inwardly directed lugs corresponding in number and arrangement to the lugs of the band of the main section, the lugs of one of said bands having mounted thereon hooks engageable with the lugs of the other of the bands to maintain the sections in assembled relation, the inner ends of coacting lugs of the main and complementary rim sections being arranged in common planes and being adapted to seat at their inner ends upon the reduced portion of a wheel felly with which the main rim section is engaged.

In testimony whereof we hereunto affix our signatures.

ORESTA WILKINS.
HAROLD SMITH.